United States Patent [19]
Fewel, Jr.

[11] Patent Number: 5,137,555
[45] Date of Patent: Aug. 11, 1992

[54] FRONTAL DRAIN FOR A MARINE MIST EXTRACTOR

[75] Inventor: Kenneth J. Fewel, Jr., Dallas, Tex.

[73] Assignee: Peerless Manufacturing Company, Dallas, Tex.

[21] Appl. No.: 288,156

[22] Filed: Dec. 22, 1988

[51] Int. Cl.⁵ .............................................. B01D 45/00
[52] U.S. Cl. .......................................... 55/440; 55/466
[58] Field of Search ............................... 55/440, 466

[56] References Cited

U.S. PATENT DOCUMENTS

| | | | |
|---|---|---|---|
| 808,897 | 1/1906 | Carrier | 55/440 |
| 1,603,878 | 10/1926 | Smith | 55/423 |
| 2,059,673 | 11/1936 | Watson | 55/428 |
| 2,187,264 | 1/1940 | Carson | 55/525 |
| 2,187,265 | 1/1940 | Carlson | 55/525 |
| 2,648,395 | 8/1953 | Pond, Jr. | 55/440 |
| 2,656,824 | 10/1953 | Devaux | 123/25 |
| 2,997,131 | 8/1961 | Fisher | 55/308 |
| 3,289,398 | 12/1966 | McIlvaine | 55/440 |
| 3,396,515 | 3/1967 | Wright | 55/525 |
| 3,527,030 | 9/1970 | Hungate | 55/440 |
| 3,564,820 | 2/1971 | Nelson | 55/306 |
| 3,616,623 | 11/1971 | Reid | 55/440 |
| 3,766,719 | 10/1973 | McAnally, III | 55/306 |
| 3,938,972 | 2/1976 | Sugimura | 55/440 |
| 4,017,275 | 4/1977 | Hodgson et al. | 55/440 |
| 4,018,580 | 4/1977 | Burkholz et al. | 55/423 |
| 4,158,449 | 6/1979 | Sun et al. | 244/136 |
| 4,234,323 | 11/1980 | Maher | 55/440 |
| 4,300,918 | 11/1981 | Cary | 55/1 |
| 4,342,570 | 8/1982 | Marjollet et al. | 55/418 |
| 4,437,867 | 3/1984 | Lerner | 55/233 |
| 4,738,698 | 4/1988 | Holcblat | 55/440 |

FOREIGN PATENT DOCUMENTS

| | | | |
|---|---|---|---|
| 1221564 | 2/1971 | United Kingdom | 55/440 |
| 1404588 | 9/1975 | United Kingdom | 55/440 |

Primary Examiner—Jay H. Woo
Assistant Examiner—Scott Bushey
Attorney, Agent, or Firm—Richards, Medlock & Andrews

[57] ABSTRACT

The present invention is an apparatus utilizing a mesh pad, located on the front of a mist extractor through which water may drain and air may pass. Water flows at a sufficient rate through said mesh pad to drain the mist extractor, and air flowing through said mesh pad is filtered of moisture and does not entrain moisture from the mist extractor.

31 Claims, 2 Drawing Sheets

5,137,555

FRONTAL DRAIN FOR A MARINE MIST EXTRACTOR

TECHNICAL FIELD

The present invention relates to an improvement in mist extractors which are installed on the inlet side of air breathing engines.

BACKGROUND OF THE INVENTION

Internal combustion engines have long been used in marine applications. However, use of a combustion engine in a marine setting presents unique problems. Specifically, it is undesirable to allow sea air, which contains moisture, salt and other contaminants into the engine. For this reason, engines for marine use are equipped with mist extractors which collect the moisture from the air before reaching the engine intake. Prior art mist extractors utilize a series of vanes positioned side by side, and placed in the intake air flow to collect moisture. The water drains by gravity to a trough and exits from the back or bottom of the mist extractor and is piped away.

However, it is not always desirable to have water draining from the back or bottom of the mist extractor for various design reasons such as space requirements, corrosion, etc.

Therefore, a mist extractor utilizing a frontal drain is desired. The frontal drain must filter air entering the drain, allow liquid to drain through the same opening and must impede air flow sufficiently so that bypass air entering through the drain will not reentrain liquid within the mist extractor.

SUMMARY OF THE INVENTION

The present invention utilizes a frontal drain configuration for mist extractors positioned on the inlet side of an air breathing engine. Liquid agglomerates on the mist extractor vanes and collects in a drain trough and subsequently flows out of the drain through a mesh pad. The mesh pad is made of an appropriate material to allow the flow of air and water, such as layers of wire mesh, steel wire, fiberglass strands, etc.

The mesh pad is sized to achieve specific design parameters. The amount of mesh pad required is small, as well as being easily accessible for cleaning and replacement purposes. Use of a mesh pad in a frontal drain configuration, eliminates the use of a liquid seal and associated drainage piping, and the need for the extra space associated with drainage piping. Further, the mesh pad cleans the bypass air of liquids.

BRIEF DESCRIPTION OF THE DRAWINGS

A more complete and better understanding of the present invention and its advantages will be had from the Detailed Description and the accompanying drawings, where.

DETAILED DESCRIPTION

Figure 1:
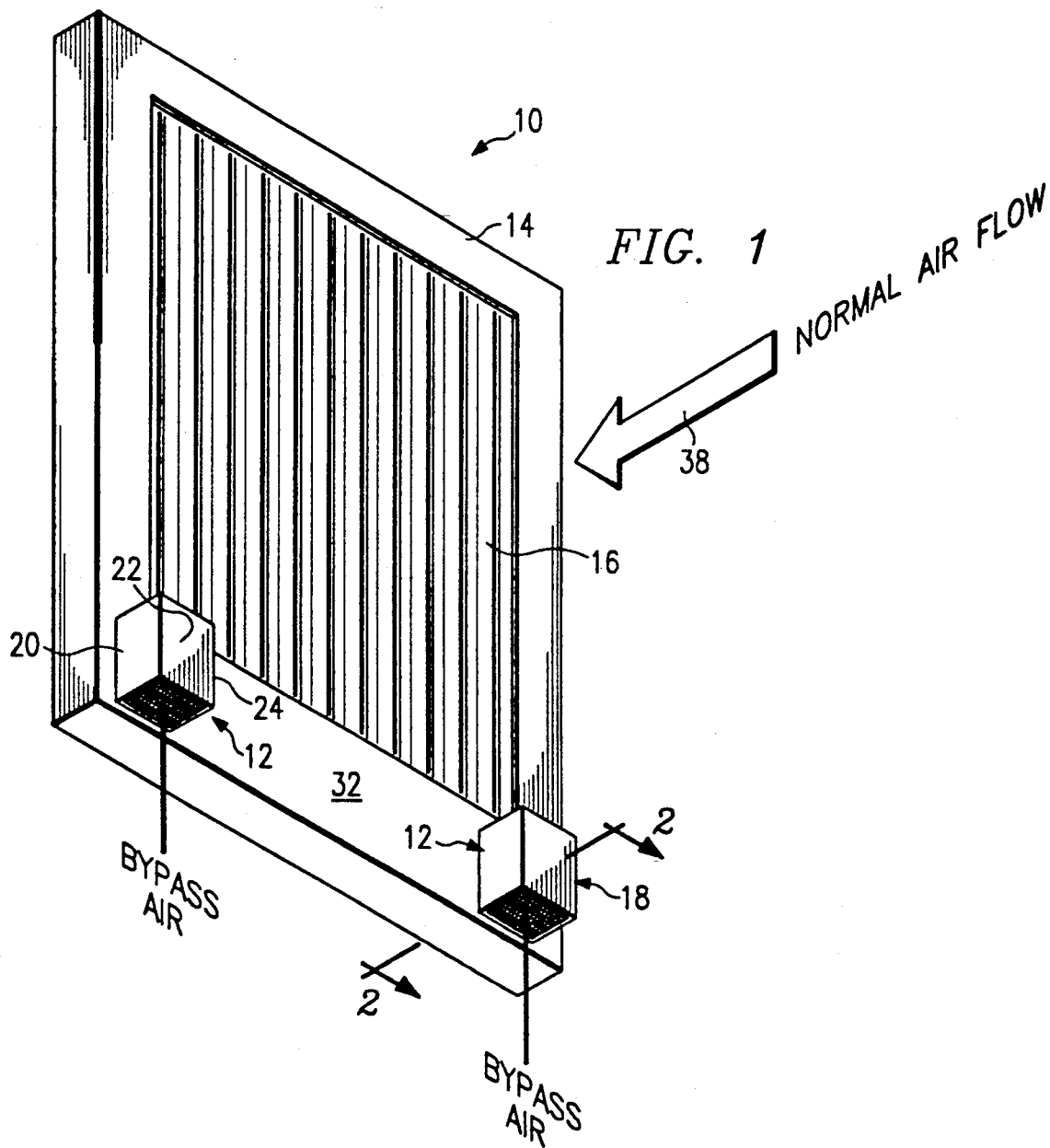
FIG. 1 is a perspective view of the present invention utilizing a mist extractor.
Figure 5:
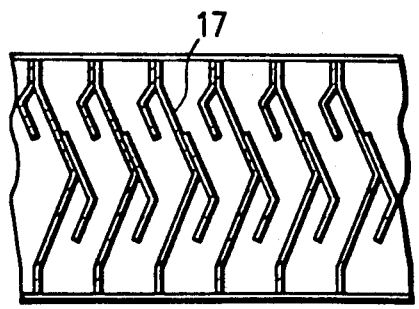
FIG. 5 is a sectional view of the mist extractor frame and vanes.

Referring now to FIG. 1 a mist extractor assembly 10 is shown utilizing an open frontal drain assembly 12. The mist extractor 10 generally incorporates a frame 14 wherein a plurality of vanes 16 are located, as seen in FIG. 5. Vanes 16 are comprised of legs 17 which are located at some angle to each other whereby air is circulated, promoting agglomeration of moisture to vanes 16.

Figure 2:
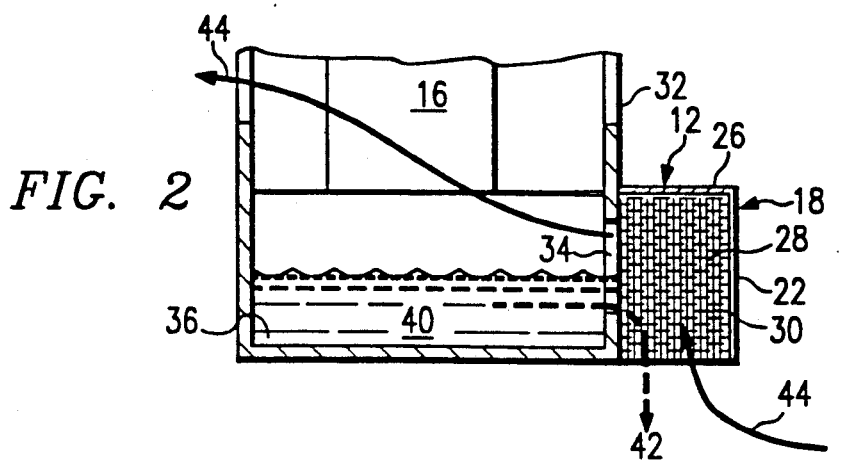
FIG. 2 is a sectional view of the present invention.

Referring now to FIG. 2 a cross section view of the open frontal drain assembly 12 is shown, incorporating a housing 18 having three sides 20, 22, 24 (See FIG. 1) and a top 26 forming a cavity 28. Cavity 28 is filled with a mesh pad 30 made of suitable material such as wire mesh, steel wire or fiberglass strands, etc. The mesh pad is a material that will allow the passage of air and water while acting as a filtering agent removing impurities from air passing therethrough.

The open frontal drain assembly 12 is attached to the front 32 of the frame 14 by a weld, adhesive, bolts or other suitable means. The open frontal drain assembly 12 is attached to the mist extractor assembly 10 whereby the mesh pad 30 communicates with the drainage trough 36 through the orifice 34 located in the front 32 of the frame 14.

Arrow 38 indicates the main flow of air over vanes 16. Water and other impurities collect on vanes 16. Collected water drips to the drainage trough 36. The water 40 flows through orifice 34 and mesh pad 30 away from the mist extractor assembly 10 as shown by arrow 42. Since the open frontal drain assembly 12 is located on the front 32 on the inlet side of frame 14 it is subject to the entrance of bypass air flow as indicated by arrow 44. Bypass air flows through the mesh pad 30 and orifice 34 into the drainage trough 36 and subsequently into the engine. The mesh pad 30 filters the bypass air of moisture and other impurities before bypass air can reach the engine intake.

Figure 3:
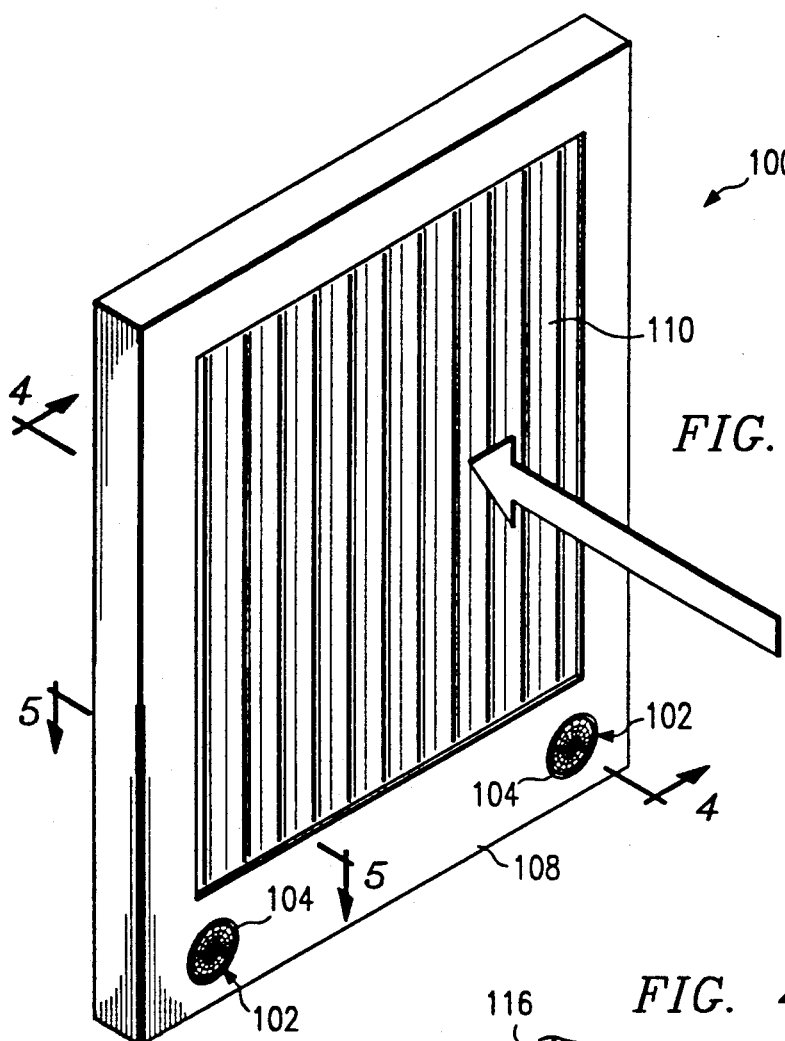
FIG. 3 is a perspective view of another embodiment of the present invention utilized in a mist extractor.
Figure 4:
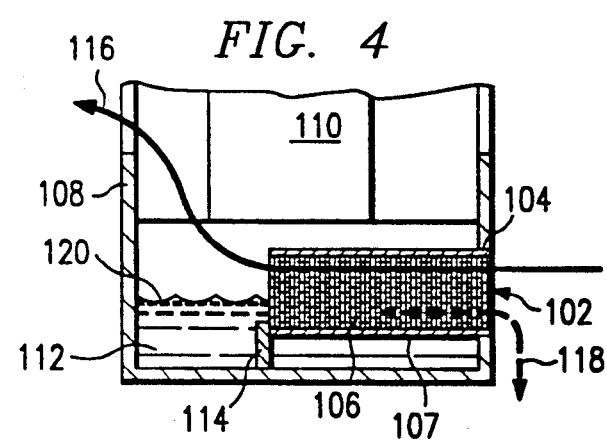
FIG. 4 is a sectional view of another embodiment of the present invention.

Referring now to FIGS. 3 and 4 another embodiment of a mist extractor assembly 100 is shown utilizing another embodiment of an open frontal drainage assembly 102 having a frontal drain opening 104 utilizing a rolled mesh pad 106 located in tube 107, inserted into frontal drain opening 104. Mist extractor assembly 100 generally incorporates a frame 108 wherein a plurality of vanes 110 comprised of legs 17 (see FIG. 5) located. Mist extractor assembly 100 also incorporates a drainage trough 112 and a stop 114 to prevent over-insertion of rolled mesh pad 106 and tube 107.

Referring now to FIG. 4, rolled mesh pad 106 is shown having a diameter (Dm) and length (Lm). Since this embodiment of the present invention exhibits counter flowing gas and liquid, as indicated by arrows 116 and 118 respectively, the length of the rolled mesh pad 106 must be sized to limit bypass air flow and the area must be sized so not to restrict liquid drainage capacity. If the rolled mesh pad 106 is not long enough, gas will bypass causing reentrainment of drainage. Alternatively, if the area of the mesh pad is too large, liquid will not be able to drain quickly enough and reentrainment of drainage will occur.

The following equations illustrate the determination of the diameter (Dm) and length (Lm) of the rolled mesh pad 106, to achieve the desired performance parameters. The rolled mesh pad may be sized based on experimentally determined coefficients or K-factors.

The factor K is simply the ratio of pressure drop to dynamic pressure.

$$Km = \frac{\Delta P}{p \frac{V^2}{2gc}} \quad (1)$$

where:
ΔP=pressure drop in P.S.F.
p=density of the medium in lbm/cu.ft.
V=velocity of flow in ft./sec.
gc=gravitational constant 32.2 lbm-ft./lbf-sec$^2$ $$Lm = \frac{2gc \Delta P}{Km \, p(225)} \quad (2)$$

$$Dm = \left[\frac{Ql\pi}{4\left(\frac{.0833 \, 2gc}{KmLm}\right)} \cdot .5\right] .5$$

Ql=liquid drainage capacity in cu.ft./sec.

To size the rolled mesh pad 106 the following three variables must be defined:
Ql=the estimated liquid drainage rate.
ΔP=the pressure drop from the front of the vane unit to the drainage trough.
Km=the K factor of the mesh pad.

Once these three variables are known, the length (Lm) and the diameter (Dm) may be determined utilizing equations (2) and (3).

Once the rolled mesh pad 106 is properly sized, it is inserted into tube 107 and subsequently into frontal drain opening 104 until it meets stop 114. Once the water level 120 rises to encompass part of the rolled mesh pad 106, liquid will flow through rolled mesh pad 106 and the frontal drain opening 104 away from the mist extractor assembly 100 as indicated by arrow 118. At the same time, bypass air may pass through rolled mesh pad 106 into the mist extractor assembly 100 as indicated by arrow 116, counter to the flow of liquid as indicated by arrow 118.

The rolled mesh pad 106 is easily installed while allowing easy access for cleaning or replacement purposes.

Although specific embodiments of the present invention have been described in the foregoing Detailed Description and illustrated in the accompanying drawings, it will be understood that the invention is not limited to the embodiments described, but is capable of numerous rearrangements, modifications, and substitutions of parts and elements without departing from the spirit of the invention. The present invention is therefore intended to encompass such rearrangements, modifications, and substitutions of parts and elements and fall within the scope of the following claims:

I claim:

1. An improved mist extractor for air breathing engines comprising:
   a frame;
   the frame having a drain trough and a frontal drain opening;
   the opening cooperating with a mesh pad which occludes the opening.

2. The mist extractor of claim 1 wherein said frame incorporates vanes.

3. The mist extractor of claim 1 wherein the density of said mesh pad is such to allow liquid to flow therethrough while filtering mist out of counter flowing air which passes therethrough, without reentraining the liquid collected in said drain trough.

4. The mist extractor of claim 1 wherein said frame has two or more frontal drain openings 5. An improved mist extractor for air breathing engines comprising:
   a frame:
   the frame further comprising a drain trough having a frontal drain opening;
   the opening cooperating with a housing which is located on the exterior of the drain trough;
   the housing having a bottom opening; and
   the housing containing a filter.

6. The mist extractor of claim 5 wherein said filter is a mesh pad.

7. The mist extractor of claim 5 wherein said housing is generally cubicle in shape.

8. The mist extractor of claim 5 wherein said frame incorporates vanes.

9. The mist extractor of claim 5 wherein said drain trough has two or more frontal drain openings.

10. The mist extractor of claim 5 wherein said filter is removable.

11. The mist extractor of claim 5 wherein said filter fills said housing.

12. An improved mist extractor for air breathing engines comprising:
    a frame;
    the frame further comprising a drain trough having a frontal drain opening;
    the opening sized receive a filter which is contained within the trough.

13. The mist extractor of claim 12 wherein said filter is generally cylindrical in shape.

14. The mist extractor of claim 12 wherein said filter is a rolled pad.

15. The mist extractor of claim 12 wherein said frontal drain opening has a predetermined diameter to accommodate a tube housing a mesh pad having a diameter Dm.

16. The mist extractor of claim 12 wherein said frontal drain opening has affixed thereto a tube which contains the filter.

17. The mist extractor of claim 12 wherein said frame further comprises a stop for positioning said filter.

18. The mist extractor of claim 12 wherein said trough incorporates two or more openings.

19. The mist extractor of claim 12 wherein said filter is completely contained within said trough.

20. The mist extractor of claim 12 wherein said filter is removable.

21. The mist extractor of claim 12 wherein said frame incorporates vanes.

22. The mist extractor of claim 12 wherein said filter maintains a length to diameter ratio whereby said filter allows liquid to flow therethrough while filtering mist out of the counter flowing air which passes therethrough, without reentraining the liquid collected in said drain trough.

23. A frontal drain for mist extractors having a series of vanes and a frame having a drain trough and frontal drain opening, comprising:
    a housing having a first and second opening and a cavity;
    a mesh pad having a composition whereby water and air flows therethrough, located in said cavity of said housing;

a connector for attaching said housing to said frame whereby the first opening of said housing is located over said drain opening, and the second opening of said housing provides a passage whereby mist collected in said drain trough may escape from said mist extractor.

24. The frontal drain of claim 23 wherein the density of said mesh pad is such to allow liquid to flow therethrough, while filtering mist out of the counter flowing air which passes therethrough without reentraining the liquid collected in said drain trough.

25. A frontal drain for mist extractors having a series of vanes and a frame having a drain trough and frontal drain opening, comprising:

a square mesh pad rolled to form a cylindrical body, having a composition whereby water and air may flow therethrough, said rolled mesh pad inserted in said frontal drain opening whereby a predetermined length $L_m$ of said rolled mesh pad is located within said drain trough.

26. The mist extractor of claim 25 wherein said filter maintains a length to diameter ratio whereby said filter allows liquid to flow therethrough while filtering mist out of the counter flowing air which passes therethrough, without reentraining the liquid collected in said drain trough.

27. The mist extractor of claim 25 wherein said drain trough has two or more frontal drain openings.

28. The mist extractor of claim 25 wherein said rolled mesh pad is removable.

29. The mist extractor of claim 13 wherein said cylindrical filter has a diameter $D_m$ and a length $L_m$.

30. The mist extractor of claim 25 wherein said cylindrical mesh pad has a Diameter $D_m$.

31. An improved mist extractor for air breathing engines of the type having means for separating moisture from air flow supplied to the engine, the engine creating a pressure differential between the front or inlet side of the mist extractor and the rear or outlet side of the mist extractor to draw air through the separation means, comprising:

a frame having a front side and a rear side and a passage therethrough, the separator means positioned in the passage, the air flowing into the passage from the front side of the frame and exiting the passage at the rear side of the frame;

the frame having a drain trough to collect moisture separated by the separator means and a drain opening through the front side of the frame;

a mesh pad occluding the frontal drain opening for permitting moisture to drain from the drain trough through the frontal drain opening while limiting air flow into the frontal drain opening from the front side of the mist extractor to minimize reentrainment of moisture into the air flow.

* * * * *